ID005815356A

United States Patent [19]
Rodriguez et al.

[11] Patent Number: 5,815,356
[45] Date of Patent: Sep. 29, 1998

[54] INTEGRATED TRANSIENT SUPPRESSOR

[75] Inventors: Edward T. Rodriguez, Winchester; Gary R. Fuchs, Princeton, both of Mass.

[73] Assignee: Power Micro, Inc., Chelmsford, Mass.

[21] Appl. No.: 938,145

[22] Filed: Sep. 26, 1997

Related U.S. Application Data

[60] Provisional application No. 60/027,052 Sep. 26, 1996.

[51] Int. Cl.⁶ ...................................................... H02H 3/20
[52] U.S. Cl. ................................ 361/91; 361/86; 361/58; 361/111; 361/118; 361/18; 323/276
[58] Field of Search ............................. 361/56, 91, 111, 361/18, 117–118, 58, 86; 307/130; 323/274–276

[56] References Cited

U.S. PATENT DOCUMENTS

| | | | |
|---|---|---|---|
| 4,536,699 | 8/1985 | Baker | 323/276 |
| 4,835,649 | 5/1989 | Salerno | 361/18 |
| 5,196,980 | 3/1993 | Carson | 361/18 |
| 5,410,441 | 4/1995 | Allman | 361/18 |
| 5,517,379 | 5/1996 | Williams et al. | 361/84 |

Primary Examiner—Jeffrey A. Gaffin
Assistant Examiner—Michael J. Sherry
Attorney, Agent, or Firm—Perkins, Smith & Cohen, LLP; Edwin H. Paul

[57] ABSTRACT

Transient protection apparatus and circuitry that allows a circuit being protected to operate during the transient and after the transient. Two types are included, one being a blocking type for use in severe conditions when little is known about the source of the transients and protection must be provided, and the other being a shunt suppresser type for use where the impedance of the transient or other parameters known about the transient allows such use. For the blocking type, when a transient voltage is detected, a series component (Q-1) decouples prevents the transient from reaching the circuit being protected. A charge pump (A-1) is provided that powers the circuit being protected during the duration of the transient. A shunt suppressor type provides a zener threshold (Z1) detector with a power boost provided by a MOSFET or IGBT (Q-30. When low voltage power levels must be protected, a charge pump (4) to bias the gate source of FET's and/or MOSFET's is provided to offset for the gate/source voltage so that output voltages in the 3.5 to 4.5 volt range may be protected.

9 Claims, 1 Drawing Sheet

INTEGRATED TRANSIENT SUPPRESSOR

RELATED APPLICATIONS

Priority is claimed under 35 U.S.C. § 119 (e) for the present invention from a Provisional Application Ser. No. 60/027,052 filed on Sep. 26, 1996 of the same title and inventors as the present application.

FIELD OF THE INVENTION

The present invention relates generally to the protection of sensitive circuitry, especially integrated solid state circuitry from transient voltage spikes or voltage surges. More particularly, the present invention provide for transient voltage protection for computer and telecom circuitry by limiting the transfer of such voltage transients from propagating via the power supplies and the DC voltages to the protected circuitry.

BACKGROUND OF THE INVENTION

For decades solid state electronic circuits have been accompanied by a vulnerability to damage by transient voltage spikes or surges. Generally, voltage spikes are characterized by voltage levels which exceed normal levels for more than a few microseconds but less than a millisecond. Transient voltage surges are generally those excessive levels which may last more than a few milliseconds and as long as a few seconds.

Transients are generally associated with a) Lightning b) equipment-generated transients, for example, inductive switching c) ESD (electrostatic discharge)

The present invention is directed to protections against transients including both spikes and surges. Such transient might typically occur when nearby relatively high current loads are switched on and off, and from indirect effects from lightning, and from ESD voltages. Most prior art systems for computer and telecom applications have specifications for protection only against transient spikes. This may be due to the fact that excessive voltage excursions lasting more than a few seconds will usually cause permanent damage which cannot be avoided without extreme over design of the circuit. Another factor, as mentioned below, is that transient protection is not given high priority by circuit designers.

Short-duration, excessive-voltage excursions or spikes can cause destructive breakdown of semiconductor device junctions and/or gate oxide layers. In the case of oxides, the damage is instantaneous and non-reversible since the discharge itself damages the oxide layer. In the case of reverse breakdown of PN junctions, the damage is caused primarily by over heating due to the power dissipated. The ability, of the PN junction to withstand the heat dissipated during a reverse breakdown, depends on the duration of the transient (and the voltage/current level) and the ability of the junction and the device and its packaging to dissipate heat. In some devices local high current density can be harmful as well.

Since voltage transients occur in virtually all electronic applications protection against these transients is and has been a continuing need. However, in the electronics industry, transient suppressing is often an after thought that is poorly understood and poorly specified. Human engineer's often take "cook book" specifications without further investigation. For example, a "cook book" may specify that a protection device rated at 300 volt clamping will protect semiconductor circuitry that is rated at 350 volts, or that a 6.2 volt specified zener will protect a 5 volt power supply that a breakdown voltage of 300 volts will protect a semiconductor rated for 350 volts against transients, or that a 6.2 volt-rated TVS diode will protect a power supply 5-volt output against over voltages. The numbers cited just above cannot be blindly accepted to guaranty protection.

PRIOR ART TRANSIENT PROTECTION-BASIC TYPES

Prior art transient suppression devices fall into the following categories

1. Metal Oxide Varistors (MOV): These devices have been used for many years and depend on the cumulative breakdown voltage characteristic of intergranular Schottky barriers for providing clamping action that limits voltage transients.

MOV's while relatively inexpensive, experience a degree of voltage rating degradation with repeated exposure to transients. Regardless of the degree of importance of this characteristic in a given application, it nevertheless has remained as a perceived liability within the industry in spite of MOV's having achieved widespread usage over the past 25 years.

Of greater concern is that the MOV has limited clamping ability. This is illustrated by the fact that MOV's do not exhibit a sharp breakdown (or "knee") characteristic. In other words its dynamic impedance is relatively high, wherein break over occurs at a specified break over voltage, the MOV voltage can increase very substantially with high transient currents after the break over voltage. As a rule of thumb, an MOV can be expected to clamp a transient voltage to about 200% of the specified voltage when the source impedance is not well known.

2. Zener diodes and related devices depend on the reverse breakdown characteristic of a PN junction for clamping action (General Semiconductor Industries produce a line of zener diode suppressors under the trademark "Transorb."

Zener diode (PN junction) type devices, like MOV's, cannot be expected to clamp the voltage much better than 150%. Zener devices cannot handle the energy of an MOV but do not experience degradation with repeated transients. Their cost is somewhat higher than the MOV. Another limit of these device is that they are limited in the available voltage ratings 3. Thyristors, including a variety of three layer (PNP), four-layer (PNPN) and five layer (NPNPN) devices which, when their breakdown voltage is exceeded, "switch on" from a high impedance state (off) to a low impedance state (on) which acts to clamp a voltage transient. Examples of these devices are marketed under the trademarks: "Sidactors", "Sidacs" and "Alternistor." These are essentially updated versions of an older product, known as "Bi-switch".

Thyristors are excellent in that, upon triggering, they drop to a low impedance and therefore do not create substantial dissipation. Cost is modest. Unfortunately, the thyristor type device are available in only a limited number of voltages. Another limitation of thyristors in a DC circuit is that, once triggered, the thyristor stays on and results in blowing of a fuse or other circuit-opening function. In other words, unlike the devices of sections 1 and 2, above, the protected circuit can not "ride through" the transient when the thryistor is triggered. The circuit must shut off and reset. This inability to provide ride-through is a fundamental and often unacceptable limitation of thyristors.

4. Gas tubes, which act in a similar fashion to the thyristors in having a voltage breakdown threshold, followed by switching to a low impedance state.

Gas tubes function virtually the same way as the thyristor except that they can handle dramatically more current. They are most useful as primary protection from lightening where survival is more important than whether the end circuit stays functional. Gas tubes have a number of nuances which make them respond different to different kinds of transients. Simply said, gas tube suppressors are viewed as brute-force, relatively imprecise devices. They find little use on printed circuit boards.

In a large number of cases (arguably the majority) the source impedance associated with a transient cannot be adequately defined. This means that a transient suppressor (as described above in sections 1, 2, 3, and 4 may be subjected to unlimited current. With a conventional shunt diode or MOV, this means that the ultimate clamping voltage cannot be predicted and therefore the degree of protection cannot be defined. In practice the protection is limited.

There are cases where the voltage (a single transient or repetitive transients) could, in fact, exist for tens or hundreds of milliseconds, a situation where a conventional shunt suppressor's peak power capability would become less useful. For example, if a transient were to last for a good part of a second, a shunt diode or MOV would experience such power dissipation and heat rise as to destroy it. For example, 100 amps at 200 volts equals 20,000 watts, such a power over virtually any time span will cause a temperature rise that will destroy most commercially available device, especially solid state.

In either of the preceding cases, it is absolutely necessary, if ride-through is desired, to effectively limit the current to a safe level while at the same time keeping the output voltage at the prescribed level. In other words, the excessive voltage must be absorbed in a minimally dissipative way.

When using shunt protection devices, such as MOV's or zener diodes, these devices may exhibit voltages of 200% (or more) of their rated specified voltage. This means that the components of the protected circuit must be rated at least at 200% of their typical operating ratings. For example, in a power supply circuit, if a shunt protection device is rated at 200 V, 200 V rated MOSFETs and other active devices (and associated passive devices, e.g. capacitors, resistors, etc.) would have to be replaced by connotes rated at 400 V. Because the size and cost of a silicon power chip can go up as the square of the voltage rating for the same current rating, the negative implications of designing to 200% of the protection devices rating are enormous in a multi-semiconductor design. In a high wattage power supply, the extra rating could add tens of dollars to the material cost of a design. Often, because of cost pressures, transient protection is employed which is actually ineffective.

It is an object of the present invention to overcome the above mentioned dynamic impedance problem. In a corresponding manner, it is an object of the present invention to provide transient protection that allows the protected circuit to continue functioning during and after the transient.

Another object of the present invention is to provide a suppressor of a size suitable for mounting along with other miniature electronic components on a printed circuit (PC) board, including surface mounting configurations.

Yet another object of the present invention is to provide protection regardless of the source impedance.

Still another object of the present invention is to provide and specify a transient voltage clamping level from which circuit components can be reliably specified.

Yet another object of the present invention is to provide a protection circuit where transient voltages are blocked from reaching a circuit being protected, while still providing power to that circuit.

Another object of the present invention is to provide a protection circuit that clamps or limits the voltage going to the circuit being protected with a characteristic that approaches that of an ideal zener diode—a near zero dynamic and static impedance in the area after the breakdown voltage.

Yet another object of the present invention is to provide a clamping action and/or a blocking action wherein the high power, high current of the transient is directed to larger power dissipation devices while substantially not affecting the clamping and the blocking action of the protection circuitry. That is the protection apparatus provides very low dynamic and static impedance after clamping.

SUMMARY OF THE INVENTION

The above objects are met in an integrated electronic protection apparatus. The protection apparatus is arranged for accepting an input voltage and conveying an output voltage to a circuit being protected. The protection apparatus is designed and arranged for providing protection against incident input voltage transient spikes and surges from appearing at the output voltage. The protection apparatus comprises: a threshold device for providing a threshold voltage, means for defining a first voltage limit for the output voltage, the first voltage limit being substantially the maximum that the circuit can withstand, and under which the circuit can continue to operate as designed, wherein the first voltage limit is derived from and related to the threshold voltage, means for defining a second voltage limit, wherein the second voltage limit is related to the threshold voltage, means for detecting an input voltage rising above the second voltage limit, and responsive to said detecting, means for limiting said output voltage to said first voltage limit.

In a preferred embodiment of the invention a power device is connected across the output voltage. The power device is normally off when the input voltage does not rise above the second voltage limit, and wherein the power device is designed and constructed to accept the entire current associated with the input voltage while maintaining the output voltage at or below the first voltage limit, and, responsive to the detecting, means for turning on the power device. In a preferred embodiment the power device comprises: a transistor, an FET, a MOSFET, an Insulated Gate FET (IGFET), or an IGBT. When an FET or equivalent is used to protect output voltages that are low, 3 to 5 volts, a charge pump is connected to offset the gate of the FET to increase the effective gate voltage so that first limit voltages down to the 3 to 5 volt levels at the output can be protected.

In another preferred embodiment, a power device connects the input and the output voltages, wherein the power device is designed and arranged for withstanding the voltage levels of the transients. Responsive to the detecting, means are provided for turning off said power device decoupling the output voltage from the input voltage. A charge pump is connected to said output voltage, wherein the charge pump is designed and constructed to supply the circuit being protected with power during the transient or surge. The charge pump may be connected to receive power from the input voltage.

The above objects are met in two preferred embodiments, one a shunt suppressor design and the second a blocker/charge pump design.

In a large number of applications the source impedance associated with the transient cannot be adequately defined, and the duration of the transient can be up to several seconds long. If the current available from the transient source is unlimited virtually no shunt protection circuitry will provide practical protection for circuitry. In this instance a protection circuit that blocks or decouples the transient voltage from the circuit being protected can be used. In present invention provides a charge pump circuit that, when the transient is decoupled from the circuit being protected, can provide current to that circuit until the transient is over.

The blocker/charge pump design provides for a series voltage regulator active device, a MOSFET or IGBT in preferred embodiments, that is conducting in a fully on state, when operating under normal condition. A charge pump is provided that is suitable for providing power to the circuit being protected for several seconds in a preferred embodiment. When a transient of a given voltage level occurs, a threshold device becomes active turning off the regulator active device and so preventing the transient voltage from reaching the circuit being protected. The excess voltage is carried across the regulator device. During this time the charge pump provides current to the circuit being protected. The threshold device and the charge pump may be buffered and protected from the transient voltage.

When a transient voltage reaches a specified voltage level, the threshold device exhibits a break over or knee characteristic that, when so activated, acts to turn off the regulator device. Whereupon the charge pump supplies current to the circuit being protected. In another preferred embodiment, the threshold device may be implemented with a comparator circuit as known in the art.

When the source impedance of the transient is known and the value is such (with the voltage peak also known) that excessive peak currents will not occur, a suppressor that acts like an ideal threshold device (like a zener diode in a preferred embodiment) can be used to advantage. In this suppresor there is a threshold device that is buffered from the transient so that the threshold level can be relied upon. Circuitry is provided to substantially maintain the threshold level at the output to the circuit being protected, but with a larger current sinking capability.

Other objects, features and advantages will be apparent from the following detailed description of preferred embodiments thereof taken in conjunction with the accompanying drawings in which:

DESCRIPTION OF PREFERRED EMBODIMENTS

The preferred designs are based on the premise that the user must have "ride-through," which is herein defined to mean that the circuit being protected runs normally and provides the normal circuit functions without shutdown or interruption during and after the transient occurs. Where continuous nearby transient generation occurs, such ride-through can be critical (i.e. fork lift truck operation, computerized stop/start motor controls, sensitive logic controls which demand continual control, etc.)

Figure 1:
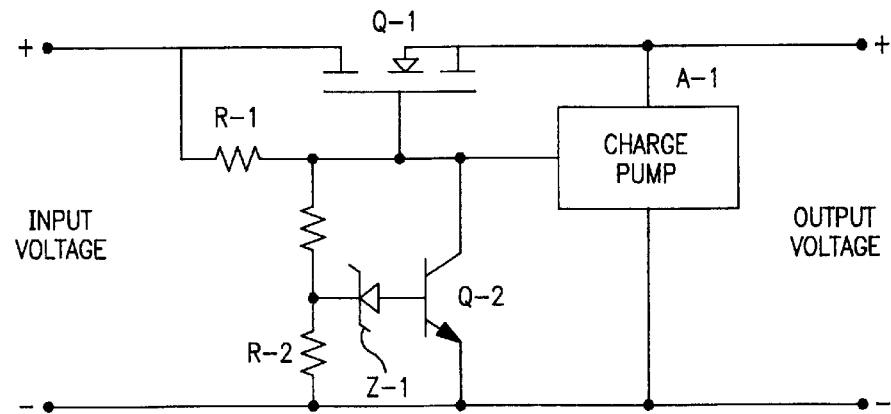
FIG. 1 is a schematic diagram of a blocker transient protection circuit.

FIG. 1 illustrates an Integrated Transient Blocker (ITB) for severe applications where the nature of the source impedance, or the size, shape, duration or repetition rate of the transients cannot be comfortably defined or anticipated.

In the circuit of FIG.1, Q-1 represents a series voltage regulator (MOSFET or IGBT) driven into partial conduction by R-1, enabling activation of charge pump A-1, which drives Q-1 into a total-on (short circuit) condition. In the presence of excessive voltage across the input voltage, Z-1 breaks down, reducing gate drive to Q-1 to a degree which causes Q-1 current to drop and its drain-source voltage to increase to a level equal to the excessive voltage, while output voltage remains at a safe level. If the output voltage attempts to rise, the gate to source voltage is reduced and Q-1 is turned further off and absorbs the voltage increases. If the transient voltage disappears, Z-1 cease conduction and Q-1 reverts to a full-on condition. R-2 is a trimmed resistor that with R-1 and the zener Z-1 (plus Q-2 base emitter drop) sets the threshold voltage for the circuit of FIG.1.

In a practical circuit, where the output could be rated at 4 amps at 300 volts, the maximum instantaneous power across Q-1 would be 5 A at 500 V or 2500 watts. Q-1 devices are available that can withstand such a power for a short time. In contrast if an MOV was place across the output voltage 2, the instantaneous current could be 100–200 amps or more resulting in instantaneous power of 50,000 watts or more for the same transient—a 20:1 power difference even disregarding the poorer clamping of the MOV.

In applications where nominal loads are no more than about 2 amps, the circuit of FIG. 1 can provide ride-through protection against transients up to 1000 volts, in an SMD (NOTE: Ed or Gary IS THERE A JEDEC EQUIVALENT NUMBER FOR THIS) package, for transients of indefinite duration and substantially zero source impedance. At higher maximum load currents, the ITB could provide the same protective capability with only a minimal amount of heat sinking to handle the steady state current through the regulator, generally characterized at about 1.5 watts per amp.

The packaging for the ITB, in a preferred embodiment, is a two-chip set—a power chip and a monolithic driver chip making use of trimmed resistors for different clamp voltage specifications. For specific applications, the entire function could be monolithic. Similarly select circuit elements could be external in order to optimize particular characteristics or offer a degree of external programmability of the limiting output clamp voltage, for example, external potentiometer or voltage source.

Figure 2:
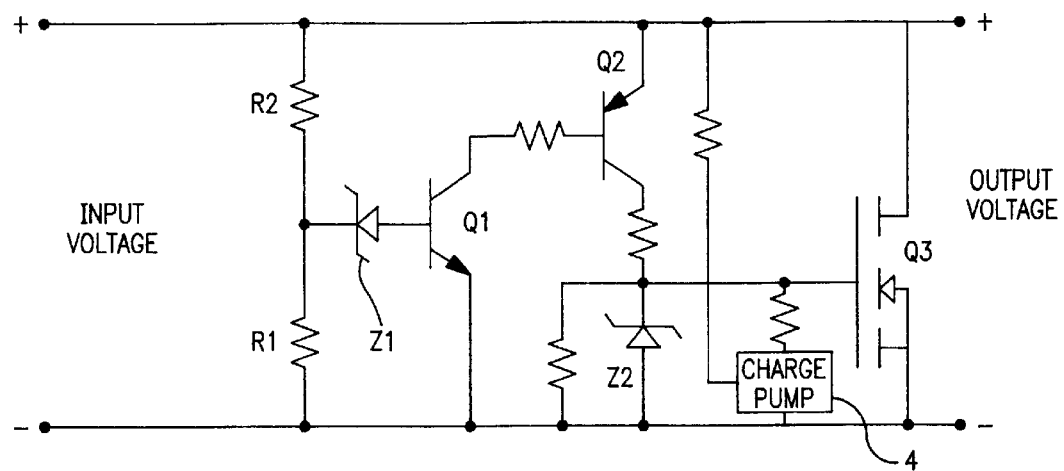
FIG. 2 is a schematic diagram of a suppressor transient protection circuit.

FIG. 2 illustrates another preferred embodiment, an Integrated Transient Shunt Suppresor (ITS), for applications where there is some control over source impedance and the size, shape, duration and repetition rate of the transients. If the transient has a duration, height, current or power level that are severe, as described above, the ITS may be insufficient for protection.

Where the source impedance is known and is of a value to prevent excessive peak transient currents, the circuit of FIG. 2 can be used, in another preferred embodiment, to reliably clamp the transient voltage to a specific level and exhibit virtually a zero dynamic impedance; i.e., act like an "ideal zener" even at currents up to 100 amperes or more. The zener diode Z1, which provides the trigger mechanism, is buffered from the transient by R2 and endures current changes in the milliamperes range. This maintains the zener Z1 close to its voltage breakdown specification or "knee". The input voltage and output voltage are shorted to each other and therefore always equal to each other. Once the input voltage, through the divider R1, R2 reaches a level of greater than the zener voltage plus the Q1 base emitter drop, Q1 will turn on and in turn supply base drive to Q2. Q2 will drives Q3's gate. Z2 is specified to keep the gate/source voltage of Q3 below its maximum rating.

At transient voltages just a few volts above breakdown, and with relatively high source impedances, the gate of Q3 need only be brought up to minimum threshold of 5–6 volts to achieve some Q3 conduction (and reduction in source-drain voltage) and resultant clamp voltage equilibrium. That is Q3 acts to divert the transient current enough to maintain the output volt at a safe level. At high transient voltages with relatively low source impedances, the gate of Q3 may have to rise up to 15 volts or more to allow Q3 to rise to a sufficient level of conduction to maintain sharp clamping and limiting of the output voltage.

The operation of the circuit in FIG. 2, however, is that the gate of Q4 will automatically seek its own level to create an equilibrium condition forcing the source/drain voltage of Q3 to a to a level approximating the breakdown level of Z1 multiplied by R2/R1 plus the current through Z1 times R2. Practical designs will maintain Z1 current small so that the load voltage can never exceed the zener voltage (plus the Q1 VBE diode drop) multiplied by the resistor divider ratio R2/R1. If the transient subsides, Z1 is no longer in its breakdown region, with Q1, Q2 and Q3 then turning off.

The instantaneous power of Q1 can be characterized just as with an MOV or TVS diode. However, there is a significant difference in that the circuit of FIG. 2 provides clamping within a few percent of the calculated value from the Z1 breakdown voltage specification.

The preferred embodiment circuit of FIG. 2 can be fabricated as a three-terminal device in a conventional TO-220 or TO-247 package in either a standard or surface mount configuration. The actual power element can be either a MOSFET or IGBT depending on the voltage or current ratings required.

In one possible configuration, the protection apparatus of FIG. 2 would consist of a two chip set. There would be a standard power chip with all other elements being in a monolithic chip processed as known in the art, e.g., with junction isolation or dielectric isolation techniques. The monolithic portion could have a standard design with different clamping voltage specifications achieved by having an on-chip, laser-trimmed thin film resistor divider R1 and R2 to set the actual clamp voltage. This approach would permit economies of scale in the silicon processing, dramatically reduce in-process inventories and employ a high yield process to tailor the protection circuit to detailed reliable specifications.

As a final extension of this product, a charge pump 4 circuit can be added to the monolithic portion to generate a supplemental voltage to raise the gate/source voltage of FET's and equivalents (MOSFET's, IGFET's, etc.) higher than the source voltage. This is needed for protection of low voltage circuits (for example, 3 to 5 volts). Field Effect Transistors (FET) of all types often require gate/source voltage higher than the voltages being protected. If an FET type with a gate/source turn-on voltage of 6 volts were used, there would insufficient gate voltage to drive Q3 into adequate conduction. A higher gate/source voltage is generated by the charge pump 4 to accommodate the low voltage applications. That charge pump is powered via R3 from the input.

With the suggested circuit, employing a MOSFET or IGBT, very precise clamping of low voltage power supply overshoots (within 10%) can be achieved at currents of over 100 amps, in a surface mounted device.

It will now be apparent to those skilled in the art that other embodiments, improvements, details and uses can be made consistent with the letter and spirit of the foregoing disclosure and within the scope of this patent, which is limited only by the following claims, construed in accordance with the patent law, including the doctrine of equivalents.

What is claimed is:

1. An integrated electronic protection apparatus for a circuit, said protection apparatus accepting an input voltage and conveying an output voltage to the circuit being protected, said protection apparatus providing protection against input voltage transient spikes and surges from appearing on said output voltage, comprising:

a threshold device for providing a threshold voltage, means for defining a first voltage limit for the output voltage, the first voltage limit being substantially the maximum that the circuit can withstand, and under which the circuit can continue to operate as designed, means for relating the first voltage limit to the threshold voltage, means for defining a second voltage limit, and means for relating the second voltage limit to the threshold voltage, means for detecting an input voltage rising above the second voltage limit, and responsive to said detecting, means for limiting said output voltage to said first voltage limit.

2. The protection apparatus of claim 1 wherein said means for limiting comprises:

a power device connected across the output voltage, said power device normally off when the input voltage does not rise above said second voltage limit, and wherein said power device designed and constructed to accept the entire current associated with the input voltage while maintaining the output voltage at said first voltage limit, and responsive to said detecting, means for turning on said power device.

3. The protection apparatus of claim 2 wherein said power device comprises: a FET, a MOSFET, an Insulated Gate FET (IGFET), or an IGBT.

4. The protection apparatus of claim 3 further comprising a charge pump for offsetting the gate/source voltage of said power device.

5. The protector of claim 1 wherein said means for limiting comprises:

a power device connecting said input and said output voltages, said power device designed and arranged for withstanding the voltage level of the transient and surge, responsive to said detecting, means for turning off said power device, and a charge pump connected to said output voltage, charge pump designed and constructed to supply the circuit being protected with power during said transient or surge, and said charge pump connected to receive power from said input voltage.

6. The protection apparatus of claim 5 further comprising:

a buffer circuit, the buffer circuit connecting the input voltage to the charge pump to supply power to the charge pump.

7. The protection apparatus of claim 6 wherein said power device comprises a transistor, an FET, a MOSFET, an IGFET, or a IGBT.

8. An integrated electronic protection apparatus for a circuit, said protection apparatus accepting an input voltage and conveying an output voltage to the circuit being protected, said protection apparatus providing protection against input voltage transients and surges from appearing on said output voltage, comprising:

a zener diode, the zener providing a threshold voltage when powered, a buffer circuit connecting the input voltage to the zener, means for defining a first voltage limit, that is related to the threshold voltage, for the output voltage, the first voltage limit being substantially the maximum that the circuit can withstand, and under which the circuit can continue to operate as designed, means for defining a second voltage limit, that is related to the threshold voltage, when the input voltage rises above the second voltage limit, the input voltage provides power to the zener thereby the zener provides a threshold voltage, a solid state power device connected to the output voltage, connecting circuitry between zener and said solid state power device, such that, responsive to the powering of the zener, said solid state device turns on accepting the current at said output voltage such that the output voltage does not rise above the first voltage limit.

9. An integrated electronic protection apparatus for a circuit, said protection apparatus accepting an input voltage and conveying an output voltage to the circuit being protected, said protection apparatus providing protection against input voltage transients and surges from appearing on said output voltage, comprising:

a zener diode, the zener providing a threshold voltage when powered, a buffer circuit connecting the input voltage to the zener, a power device connecting the input voltage to the output voltage, means for defining a first voltage limit, that is related to the threshold voltage, the first voltage limit being substantially the maximum that the circuit can withstand, and under which the circuit can continue to operate as designed, means for defining a second voltage limit that is related to the threshold voltage, when the input voltage rises above the second voltage limit, the input voltage provides power to the zener thereby the zener provides a threshold voltage, connecting circuitry between zener and said power device, such that, responsive to the powering of the zener, said power device turns off decoupling the output voltage from the input voltage, such that the output voltage does not rise above the first voltage limit, a charge pump connected to said output voltage, the charge pump designed and constructed to supply the circuit being protected with power during said transient or surge, and said charge pump connected to receive power from said input voltage.

* * * * *